United States Patent
Cao

(10) Patent No.: US 10,044,931 B2
(45) Date of Patent: Aug. 7, 2018

(54) CAMERA AUTO-FOCUSING OPTIMIZATION METHOD AND CAMERA

(71) Applicant: ZTE CORPORATION, Shenzhen, Guangdong Province (CN)

(72) Inventor: Hongyan Cao, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/318,979

(22) PCT Filed: Oct. 23, 2014

(86) PCT No.: PCT/CN2014/089336
§ 371 (c)(1),
(2) Date: Dec. 15, 2016

(87) PCT Pub. No.: WO2015/192570
PCT Pub. Date: Dec. 23, 2015

(65) Prior Publication Data
US 2017/0150043 A1 May 25, 2017

(30) Foreign Application Priority Data

Jun. 17, 2014 (CN) .......................... 2014 1 0270682

(51) Int. Cl.
H04N 5/232 (2006.01)
H04N 5/265 (2006.01)

(52) U.S. Cl.
CPC ..... H04N 5/23232 (2013.01); H04N 5/23212 (2013.01); H04N 5/23293 (2013.01); H04N 5/265 (2013.01)

(58) Field of Classification Search
CPC . H04N 5/23293; H04N 5/23212; H04N 5/265
See application file for complete search history.

(56) References Cited

U.S. PATENT DOCUMENTS

| 6,344,930 B1 | 2/2002 | Kaneko et al. | |
| 2003/0151679 A1* | 8/2003 | Amerson | H04N 5/23212 348/231.6 |
| 2008/0138055 A1* | 6/2008 | Dunko | H04N 5/23212 396/89 |
| 2009/0058328 A1* | 3/2009 | Ishii | H02P 25/034 318/135 |

(Continued)

FOREIGN PATENT DOCUMENTS

| CN | 102393958 A | 3/2012 |
| CN | 102542545 A | 7/2012 |

(Continued)

*Primary Examiner* — Ahmed A Berhan
(74) *Attorney, Agent, or Firm* — Ling Wu; Stephen Yang; Ling and Yang Intellectual Property

(57) ABSTRACT

An auto-focusing optimization method for a camera and a camera are provided. The auto-focusing optimization method for a camera includes: shooting, in an focusing manner, at least the first image and the second image after the camera is started; synthesizing the first and the second image; and displaying an image after synthesis processing. The above scheme is capable of optimizing an image shot in a focusing manner and improving the definition of the image.

20 Claims, 3 Drawing Sheets

(56) References Cited

U.S. PATENT DOCUMENTS

| | | |
|---|---|---|
| 2009/0059057 A1 | 3/2009 | Long et al. |
| 2009/0310885 A1* | 12/2009 | Tamaru .............. H04N 5/23212 382/275 |
| 2011/0317034 A1* | 12/2011 | Athreya ................ H04N 5/772 348/231.99 |
| 2013/0314586 A1 | 11/2013 | Shimamoto et al. |

FOREIGN PATENT DOCUMENTS

| | | |
|---|---|---|
| CN | 103188428 A | 7/2013 |
| CN | 103561205 A | 2/2014 |
| EP | 0484076 A2 | 5/1992 |
| JP | H05-304675 A | 11/1993 |
| JP | 2009-111774 A | 5/2009 |
| JP | 2014-39241 A | 2/2014 |

\* cited by examiner

CAMERA AUTO-FOCUSING OPTIMIZATION METHOD AND CAMERA

TECHNICAL FIELD

The present document relates to the field of image processing technologies, and in particular to an auto-focusing optimization method for a camera and a camera.

BACKGROUND

Definition is absolutely the answer to what is most important for the quality of an image shot by a camera with an auto-focusing function, for example, a mobile phone. According to the a focusing method based on the principle of convex lens imaging, the relationship among focal length f, object distance u and image distance v is as follows:

$$\frac{1}{f} = \frac{1}{u} + \frac{1}{v},$$

that is, object distance u is inversely proportional to image distance after focal length f is fixed. On the other hand, according to the principle of motor focusing, if the focal length of a camera shot system is 4.88 mm, then image distance v is 4.885 mm when object distance u is 5 m but 5.130 mm when object distance u is 10 cm, that is, an image object difference of 0.245 mm is generated in the photographing of an object at a distance of 5 m and then an object at a distance of 10 m.

At present, the achievement of adjusting the camera shot to be far or near is through the locking of the lens of the camera in a voice coil motor, which is abbreviated as VCM. The VCM consists mainly of a coil, a magnet set and elastic sheets, and the coil is fixed in the magnet set by an upper and a lower elastic sheet. A magnetic field is generated by the coil when the coil is electrified, and the coil moves up under the interaction of the magnetic field of the coil with the magnet set, accompanied by the movement of the lens of the camera locked inside the coil. When powered off, the coil returns through the elastic force of the elastic sheets, thereby realizing an auto-focusing function.

A judgment on an auto-focusing motor of VCM elastic sheets is mainly according to the correspondence between current and object distance. In the correspondence between current and object distance, generally, a current of 15 mA is used as a starting current, that is, the minimal current. If each increase of the current by 10 mA results in the same driven distance, then the camera is qualified. If the precise is that each increase by 5 mA results in the same driven distance, then the camera is high-qualified, and so on. However, a corresponding error occurs if the correspondence between current and object distance is not a linear relation, and the images shot may be partially unclear, making it hard to provide a wholly clear image.

The above content is merely to assist in understanding the technical solution of the present document n but not for the acknowledging of the above content as the conventional art.

SUMMARY

The present document is mainly intended to address the problem that the images shot are not clear enough resulted from the existence of an error in the correspondence between the input current of a VCM and object distance in a camera.

To address the foregoing technical problems, the following technical solutions are provided.

An auto-focusing optimization method for a camera includes the following steps of:

shooting, in an auto-focusing manner, at least a first image and a second image at a same position and a same shooting angle after the camera is started;

synthesizing the first and the second image; and displaying an image after synthesis processing.

Optionally, the step of shooting, in an auto-focusing manner, at least a first image and a second image at the same position and the same shooting angle after the camera is started comprises:

adjusting an input current of a voice coil motor of the camera to a first current to focus and shoot the first image; and adjusting the input current of the voice coil motor of the camera to a second current to focus and shoot the second image.

Optionally, the step of synthesizing the first and the second image comprises:

acquiring corresponding portions from the first and the second image and dividing the corresponding portions into pixel blocks conforming to a one-to-one correspondence relationship;

evaluating the pixel blocks conforming to the one-to-one correspondence relationship in the first and the second image to obtain the pixel blocks of high definition; and synthesizing the obtained pixel blocks.

Optionally, the step of evaluating the pixel blocks conforming to the one-to-one correspondence relationship in the first and the second image to obtain the pixel blocks of high definition comprises:

acquiring a pixel density ρi of each of the pixel blocks conforming to the one-to-one correspondence relationship in the first and the second image; and acquiring a pixel distance Li between each pixel block and each adjacent pixel block according to the pixel density ρi; and selecting the pixel block with the biggest pixel distance Li in the pixel blocks conforming to the one-to-one correspondence relationship as a pixel block of high definition.

Optionally, the step of acquiring a pixel distance Li between each pixel block and each adjacent pixel block according to the pixel density ρi comprises:

acquiring a sum of squares of pixel density differences between each pixel block and each adjacent pixel block, and extracting a square root of the sum of the squares to obtain the pixel distance Li.

A camera comprises a shooting module, a synthesis module and a display module, herein the shooting module is arranged to shoot, in an auto-focusing manner, at least a first image and a second image at a same position and a same shooting angle after the camera is started;

the synthesis module is arranged to synthesize the first and the second image; and the display module is arranged to display an image after synthesis processing.

Optionally, the shooting module comprises a first shooting unit and a second shooting unit, herein the first shooting unit is arranged to adjust an input current of a voice coil motor of the camera to a first current to focus and shoot the first image; and the second shooting unit is arranged to adjust the input current of the voice coil motor of the camera to a second current to focus and shoot the second image. Optionally, the synthesis module comprises a division unit, an evaluation unit and a synthesis unit, herein the division unit is arranged to acquire corresponding portions from the first and the second image and divide the corresponding portions into pixel blocks conforming to a one-to-one correspondence relationship;

The evaluation unit is arranged to evaluate the pixel blocks conforming to the one-to-one correspondence relationship in the first and the second image to obtain the pixel blocks of high definition; and the synthesis unit is arranged to synthesize the obtained pixel blocks. Optionally, the evaluation unit comprises a first acquisition sub-unit, a second acquisition sub-unit and a selection sub-unit, herein the first acquisition sub-unit is arranged to acquire a pixel density ρi of each of the pixel blocks conforming to the one-to-one correspondence relationship in the first and the second image to obtain the pixel blocks of high definition; and the second acquisition sub-unit is arranged to acquire a pixel distance Li between each pixel block and each adjacent pixel block according to the pixel density ρi; and the selection sub-unit is arranged to select the pixel block with the biggest pixel distance Li in the pixel blocks conforming to the one-to-one correspondence relationship as a pixel block of high definition.

Optionally, the second acquisition sub-unit is arranged to acquire the pixel distance Li between each pixel block and each adjacent pixel block according to the pixel density ρi in a following way:

acquiring a sum of squares of pixel density differences between each pixel block and each adjacent pixel block, and extracting a square root of the sum of the squares to obtain the pixel distance Li.

A computer program includes program instructions which, when executed by a camera, cause the camera to execute the above mentioned auto-focusing optimization method for a camera.

A carrier carries the foregoing computer program.

By shooting, in an auto-focusing manner, two or more clear images at the same position and the same shooting angle and synthesizing the images to acquire the clearest one of corresponding portions in different images and use the acquired clearest one as the portion for synthesizing the images finally, the auto-focusing optimization method for a camera and the camera optimize portions of an image to provide a clearer final displayed image, improving the definition of the whole image, addressing the drawback that the images shot are not clear enough resulting from the existence of an error in the correspondence between the input current of a VCM and object distance.

The achievement of the objects, the functional features and the advantages of the present document will be further described below with reference to accompanying drawings in conjunction with embodiments.

PREFERRED EMBODIMENTS OF THE PRESENT DOCUMENT

It should be appreciated that the specific embodiment described herein are merely illustrative of, but are not to be construed as limiting the present document.

Figure 1:
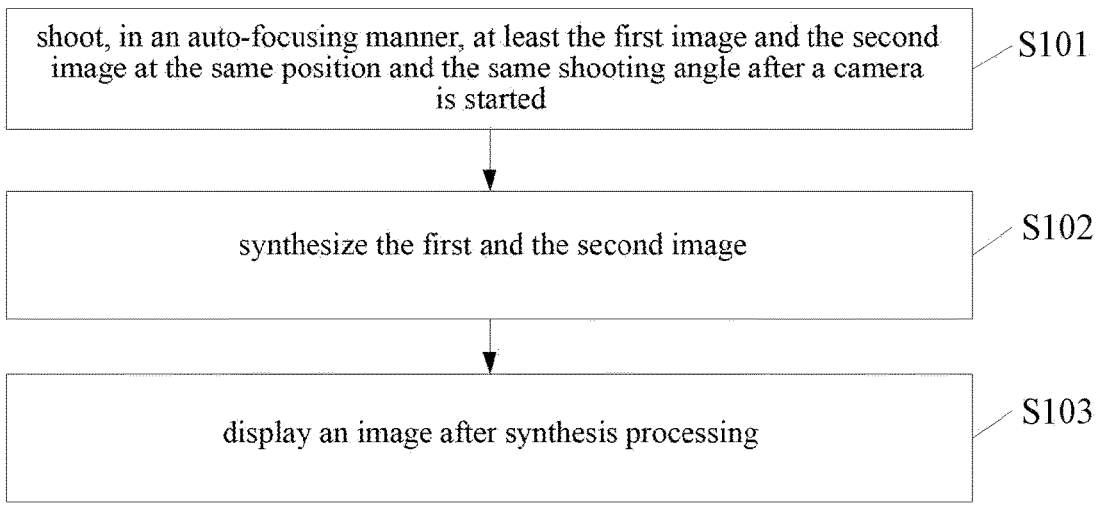
FIG. 1 is a flowchart illustrating an auto-focusing optimization method for a camera provided in one embodiment of the present document.

The embodiment of the present document provides an auto-focusing optimization method for a camera. As shown in FIG. 1, in one embodiment, the auto-focusing optimization method for a camera includes the following steps.

Step S101: the camera, after being started, shoots at least the first image and the second image at the same position and the same shooting angle in an auto-focusing manner.

In the embodiment, the camera may be a separate camera or a camera built in an intelligent terminal such as a mobile phone.

In the embodiment, after the camera is started, a series of preparations including that the lens in the camera is powered on, a clock is set, a register is initialized make the camera enter a normal working state to be prepared for image shooting.

Herein, in the embodiment, at least two clear images, that is, the first image and the second image, are shot at the same position and the same shooting angle in an auto-focusing manner. Practically, if the requirement of the user on the definition of images is relatively high, then a plurality of clear images, for example, three, four or more, are shot in an auto-focusing manner because the more images the clearer the final image displayed after image processing is. Because the storage space provided by a camera is limited, the size of the images shot in the embodiment is generally not above 2M, and besides, images of larger than 2M will influence the subsequent processing.

Optionally, in the embodiment, a close-shot image and a long-shot image may be shot in an auto-focusing manner.

Step S102, the first and the second image are synthesized;

In the embodiment, synthesizing the first and the second image includes: acquiring corresponding clear portions from the first and the second image, synthesizing the clear portions so as to replace an unclear portion of an image with a clear portion from another image so that each portion of the image resulting from the synthesis is the corresponding clearer portion from the two images and the whole image resulting from the synthesis is clear.

In the embodiment, a plurality of images shot in a focusing manner may also be synthesized in the way the same as the way described above for the synthesis processing on the two images, that is, the clearest one of corresponding portions is taken from the plurality of images. The more the synthesized images are, the clearer the image displayed finally after the synthesis is.

Optionally, the foregoing close-shot image and long-shot image may be synthesized in the embodiment.

In specific implementations, the shot first and the second image may be divided into, for example, pixel blocks of 25*25 first. If a certain character portion of the first image is indistinct, while the corresponding character portion of the second image is clear, then such portion in both images may be divided evenly into a plurality of pixel blocks each of which includes a plurality of pixel points, and the clear pixel blocks are acquired as the synthesized portion of the final image resulting from the synthesis.

In the embodiment, each pixel block has a pixel density which represents the average brightness of the pixel block. If a certain pixel block includes pixels 1, 2, 3 and 4 which correspond to brightness 5, 6, 7 and 8, then the pixel density of the pixel block is (5+6+7+8)/4=6.5.

In the embodiment, the definition is evaluated by using the pixel density difference between each pixel block and adjacent pixel blocks as the standard, that is, in two images, the higher the pixel density difference between a pixel block and adjacent pixel blocks is, the clearer such portion is. In contrary, the image is vague.

Step S103, an image resulting from the synthesis is displayed.

In the embodiment, an image resulting from the synthesis is displayed on the camera or an intelligent terminal. Compared with the first or second image before the synthesis processing, local position is clearer, and thus the whole image is clearer.

Compared with the traditional art, by shooting, in an auto-focusing manner, two or more clear images at the same position and the same shooting angle and synthesizing the images to acquire the clearest one of corresponding portions in different images and use the acquired clearest one as the portion for synthesizing the images finally, the embodiment optimizes portions of an image to provide a clearer final displayed image, improving the definition of the whole image, addressing the drawback that the images shot are not clear enough resulting from the existence of an error in the correspondence between the input current of a VCM and object distance, especially satisfying the requirement for shooting an image containing a large area of characters to display clearly all the characters included in the finally displayed image.

Figure 2:
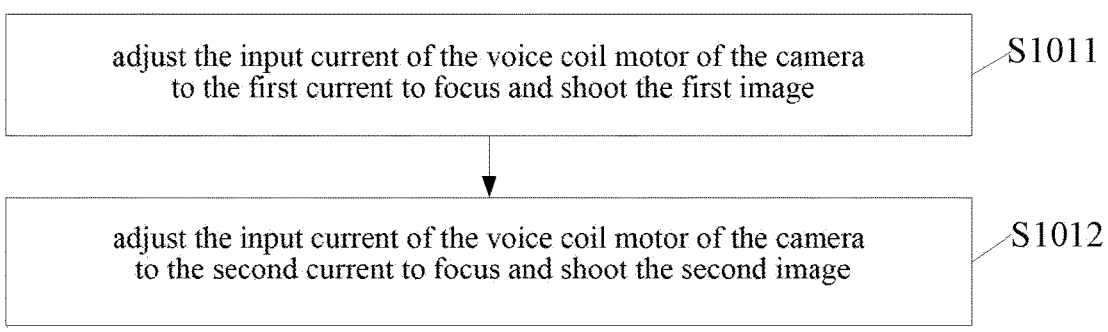
FIG. 2 is a flowchart illustrating detailed flow of Step S101 shown in FIG. 1.

In an alternative embodiment, on the basis of the embodiment shown in FIG. 1, the above Step S101 includes, as shown in FIG. 2, the following steps.

Step S1011: the input current of the voice coil motor of the camera is adjusted to the first current to focus and shoot the first image; and Step S1012: the input current of the voice coil motor of the camera is adjusted to the second current to focus and shoot the second image.

In the embodiment, as the input current of the VCM and object distance conform to a function relationship, the camera can be focused to shoot clear images finally.

In the embodiment, the first or second current may be any different current in the corresponding function of the input current of the voice coil motor and the camera. Moreover, the third or fourth current different from the first and the second current may also be used in the embodiment to focus to shoot a plurality of images.

Optionally, the maximum current and the minimal current in the corresponding function of the input current of the VCM and object distance can be used to shoot the close-shot image and the long-shot image, respectively.

Figure 3:
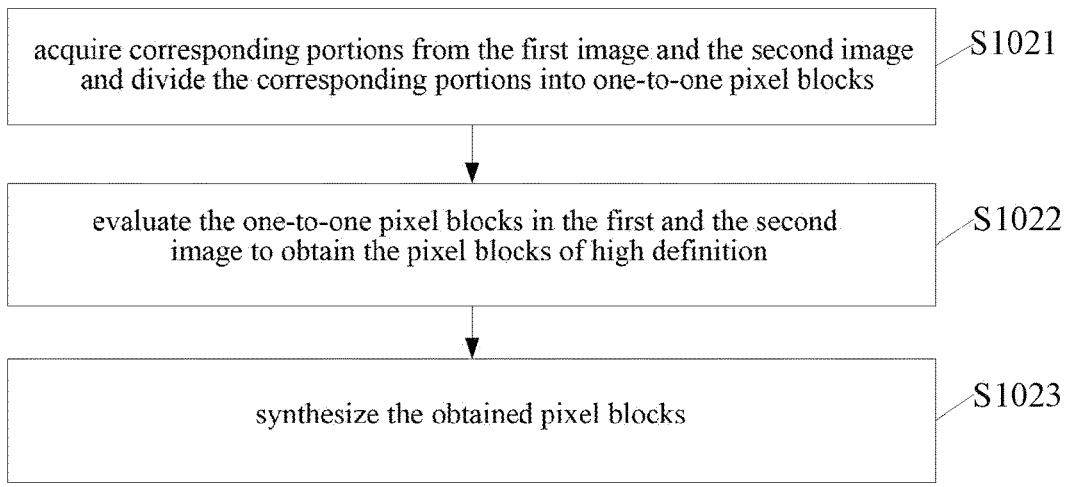
FIG. 3 is a flowchart illustrating detailed flow of Step S102 shown in FIG. 1.

As shown in FIG. 3, in an alternative embodiment, the above Step S102 includes, on the basis of the embodiment shown in FIG. 1, the following steps.

Step S1021: corresponding portions are acquired from the first image and the second image, and the corresponding portions are divided into pixel blocks conforming to a one-to-one correspondence relationship.

Step S1022: the pixel blocks conforming to a one-to-one correspondence relationship in the first and the second image are evaluated to obtain the ones of high definition; and Step S1022: the obtained pixel blocks are synthesized.

In the embodiment, the contents included in the first and the second image may be different. For example, a long-shot image may include more contents and the close-shot image may include less contents. Corresponding portions of the first and the second image are acquired and then divided into pixel blocks conforming to a one-to-one correspondence relationship.

In the embodiment, each pixel block has a pixel density which represents the average brightness of the pixel block. The definition is evaluated by the pixel density difference between the pixel block and adjacent pixel blocks, that is, in two images, the higher the pixel density difference between a pixel block and adjacent pixel blocks is, the clearer such portion is relatively. In contrary, the image is vague.

Figure 4:
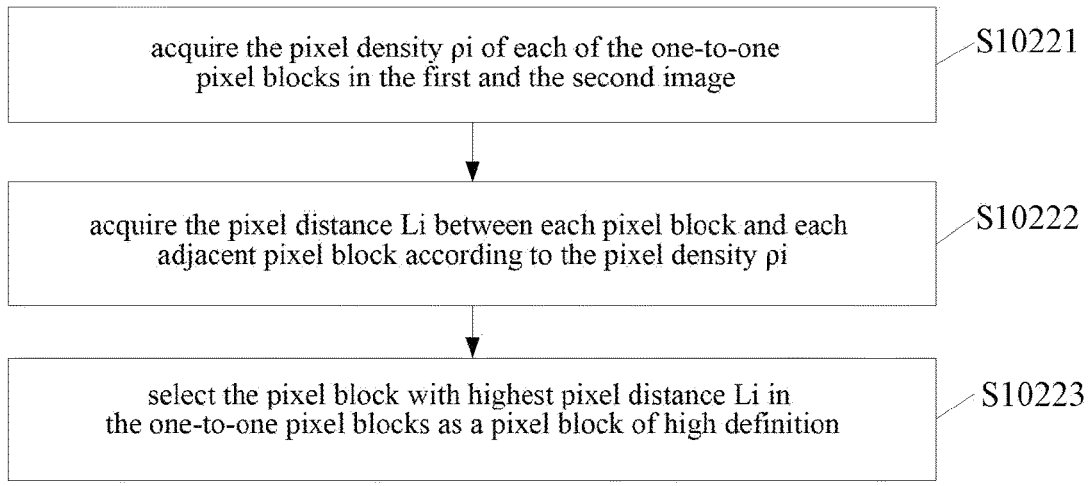
FIG. 4 is a flowchart illustrating detailed flow of Step S1022 shown in FIG. 3.

As shown in FIG. 4, in an alternative embodiment, Step S1022 includes, on the basis of the embodiment shown in FIG. 3, the following steps.

Step S10221: the pixel density ρi of each of the pixel blocks conforming to a one-to-one correspondence relationship in the first and the second image is acquired.

Step S10221: the pixel distance Li between each pixel block and each adjacent pixel block is acquired according to the pixel density ρi.

Step S10221: the pixel block with the biggest pixel distance Li in the pixel blocks conforming to a one-to-one correspondence relationship is selected as a pixel block of high definition.

Herein, acquiring the pixel distance Li between each pixel block and each adjacent pixel block according to the pixel density ρi is particularly: acquiring the sum of the squares of the pixel density differences between each pixel block and each adjacent pixel block and extracting the square root of the sum of squares to obtain the pixel distance Li.

The embodiment is described below based on an example.

The first image and the second image are both divided into 25 pixel blocks of 5*5, herein the pixel block 13 is as the center area, as shown in the following Table 1.

TABLE 1

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |

Herein the pixel densities of the corresponding pixel blocks are ρ1, ρ2, . . . , ρ25.

Moreover, the pixel distance between a pixel block and adjacent pixel blocks is defined as Li (i=1, 2 . . . 25), as shown in the following Table 2.

TABLE 2

| L1  | L2  | L3  | L4  | L5  |
|-----|-----|-----|-----|-----|
| L6  | L7  | L8  | L9  | L10 |
| L11 | L12 | L13 | L14 | L15 |
| L16 | L17 | L18 | L19 | L20 |
| L21 | L22 | L23 | L24 | L25 |

The pixel distances L1, L5, L21 and L25 of four corners are as follows:

$L1=\mathrm{sqrt}[(\rho1-\rho2)^2+(\rho1-\rho6)^2+(\rho1-\rho7)^2];$ $L5=\mathrm{sqrt}[(\rho5-\rho4)^2+(\rho5-\rho9)^2+(\rho5-\rho10)^2];$ $L21=\mathrm{sqrt}[(\rho21-\rho16)^2+(\rho21-\rho17)^2+(\rho21-\rho22)^2];$ $L25=\mathrm{sqrt}[(\rho25-\rho19)^2+(\rho25-\rho20)^2+(\rho25-\rho24)^2].$ The pixel distances L2, L3 and L4 of upper borders are as follows:

$Li=\mathrm{sqrt}[(\rho i-\rho(i-1))^2+(\rho i-\rho(i+1))^2+(\rho i-\rho(i+4))^2+(\rho i-\rho(i+5))^2+(\rho i-\rho(i+6))^2];\ (i=2,3,4)$ The pixel distances L22, L23 and L24 of lower borders are as follows:

$Li=\mathrm{sqrt}[(\rho i-\rho(i-1))^2+(\rho i-\rho(i+1))^2+(\rho i-\rho(i-4))^2+(\rho i-\rho(i-5))^2+(\rho i-\rho(i-6))^2];\ (i=22,23,24)$ The pixel distances L6, L11 and L16 of left borders are as follows:

$Li=\mathrm{sqrt}[(\rho i-\rho(i-5))^2+(\rho i-\rho(i+1))^2+(\rho i-\rho(i-4))^2+(\rho i-\rho(i+5))^2+(\rho i-\rho(i+6))^2];\ (i=6,11,16)$ The pixel distances L10, L15 and L20 of right borders are as follows:

$Li=\mathrm{sqrt}[(\rho i-\rho(i-5))^2+(\rho i-\rho(i-1))^2+(\rho i-\rho(i-6))^2+(\rho i-\rho(i+5))^2+(\rho i-\rho(i+4))^2];\ (i=10,15,20)$ The pixel distances L7, L8, L9, L12, L13, L14, L17, L18 and L19 of middle portions are as follows:

$Li=\mathrm{sqrt}[(\rho i-\rho(i-6))^2+(\rho i-\rho(i-5))^2+(\rho13-\rho(i-4))^2+(\rho i-\rho(i-1))^2+(\rho i-\rho(i+1))^2+(\rho i-\rho(i+4))^2+(\rho i-\rho(i+5))^2+(\rho i-\rho(i+6))^2],\ (i=7,8,9,12,13,14,17,18,19)$ In the embodiment, the pixel distances Li of the pixel blocks in the first and the second image which conform to a one-to-one correspondence relationship are analyzed to select the pixel block with the biggest pixel distance Li in both pixel blocks as a pixel block of high definition. For example, if the pixel distance L6 of the pixel block 6 in the first image is greater than the pixel distance L6 of the pixel block 6 in the second image, then the pixel block 6 in the first image is higher in definition than the pixel block 6 in the second image, and the pixel block 6 in the first image is selected as the part to synthesize for image synthesis.

Figure 5:
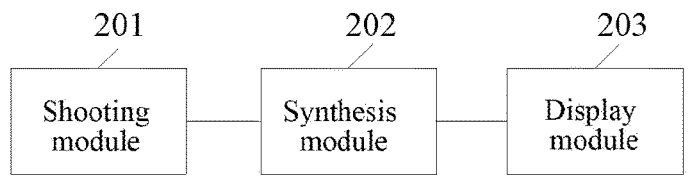
FIG. 5 is a schematic diagram illustrating the functional modules of a camera according to an embodiment of the present document.

A camera is further provided in an embodiment of the present document. As shown in FIG. 5, the camera in one embodiment includes:

a shooting module 201, arranged to shoot, in an auto-focusing manner, at least a first image and a second image at the same position and the same shooting angle after the camera is started.

In the embodiment, the camera may be a separate camera or a camera built in an intelligent terminal such as the camera in a mobile phone.

In the embodiment, after the camera is started, a series of preparations including that the lens in the camera is powered on, a clock is set, a register is initialized make the camera enter a normal working state to be prepared for image shooting.

Herein, in the embodiment, at least two clear images, that is, the first image and the second image, are shot at the same position and the same shooting angle in an auto-focusing manner. Practically, if the requirement of the user on the definition of images is relatively high, then a plurality of clear images, for example, three, four or more, are shot in an auto-focusing manner because the more images the clearer the final image displayed after image processing is. Because the storage space provided by a camera is limited, the size of the images shot in the embodiment is generally not above 2M, and besides, images of larger than 2M will influence the subsequent processing.

Optionally, in the embodiment, a close-shot image and a long-shot image may be shot in an auto-focusing manner.

The synthesis module 202 is arranged to synthesize the first and the second image.

In the embodiment, synthesizing the first and the second image includes: acquiring corresponding clear portions from the first and the second image, synthesizing the clear portions so as to replace an unclear portion of an image with a clear portion from another image so that each portion of the image resulting from the synthesis is the corresponding clearer portion from the two images and the whole image resulting from the synthesis is clear.

In the embodiment, a plurality of images shot in a focusing manner may also be synthesized in the way the same as the way described above for the synthesis processing on the two images, that is, the clearest one of corresponding portions is taken from the plurality of images. The more the synthesized images are, the clearer the image displayed finally after the synthesis is.

Optionally, the foregoing close-shot image and long-shot image can be synthesized in the embodiment.

In specific implementations, the shot first and the second image may be divided into, for example, pixel blocks of 25*25 first. If a certain character portion of the first image is indistinct, while the corresponding character portion of the second image is clear, then such portion in both images may be divided evenly into a plurality of pixel blocks each of which includes a plurality of pixel points, and the clear pixel blocks are acquired as the synthesized portion of the final image resulting from the synthesis.

In the embodiment, each pixel block has a pixel density which represents the average brightness of the pixel block. If a certain pixel block includes pixels 1, 2, 3 and 4 which correspond to brightness 5, 6, 7 and 8, then the pixel density of the pixel block is (5+6+7+8)/4=6.5.

In the embodiment, the definition is evaluated by using the pixel density difference between each pixel block and adjacent pixel blocks as the standard, that is, in two images, the higher the pixel density difference between a pixel block and adjacent pixel blocks is, the clearer such portion is. In contrary, the image is vague. The display module 203 is arranged to display an image resulting from the synthesis.

In the embodiment, an image resulting from the synthesis is displayed on the camera or an intelligent terminal. Compared with the first or second image before the synthesis processing, local position is clearer, and thus the whole image is clearer.

Figure 6:
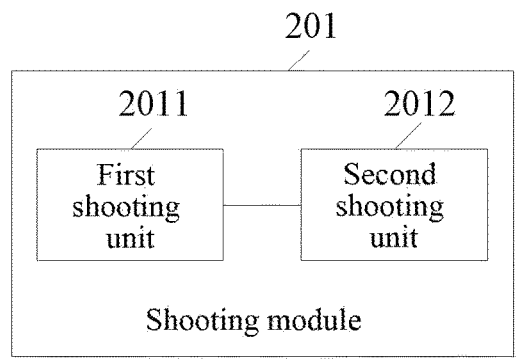
FIG. 6 is a schematic diagram illustrating detailed functional modules of the shooting module shown in FIG. 5.

As shown in FIG. 6, in an alternative embodiment, on the basis of the embodiment shown in FIG. 5, the shooting module 201 includes:

a first shooting unit 2011 arranged to adjust the input current of the voice coil motor of the camera to the first current to focus and shoot the first image; and a second shooting unit 2012 arranged to adjust the input current of the voice coil motor of the camera to a second current to focus and shoot the second image.

In the embodiment, as the input current of the VCM and object distance conform to a function relationship, the camera can be focused to shoot clear images finally.

In the embodiment, the first or second current may be any different current in the corresponding function of the input current of the voice coil motor and the camera. Moreover, the third or fourth current different from the first and the second current may also be used in the embodiment to focus to shoot a plurality of images.

Optionally, the maximum current and the minimal current in the corresponding function of the input current of the VCM and object distance can be used to shoot the close-shot image and the long-shot image, respectively.

Figure 7:
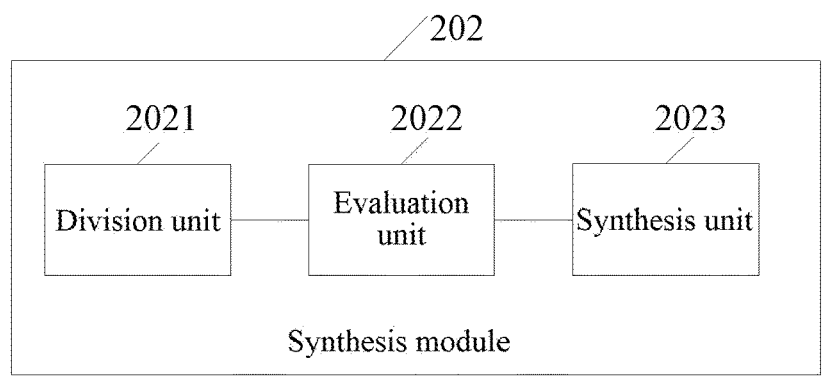
FIG. 7 is a schematic diagram illustrating detailed functional modules of the synthesis module shown in FIG. 5.

As shown in FIG. 7, in an alternative embodiment, on the basis of the embodiment shown in FIG. 5, the synthesis module 202 includes:

a division unit 2021 arranged to acquire corresponding image portions from the first image and the second image and divide the corresponding portions into pixel blocks conforming to a one-to-one correspondence relationship;

an evaluation unit 2022 arranged to evaluate the pixel blocks conforming to a one-to-one correspondence relationship in the first and the second image to obtain the ones of high definition; and A synthesis unit 2023 is arranged to synthesize the obtained pixel blocks.

In the embodiment, the contents included in the first and the second image may be different. For example, a long-shot image may include more contents and the close-shot image may include less contents. Corresponding portions of the first and the second image are acquired and then divided into pixel blocks conforming to a one-to-one correspondence relationship.

Figure 8:
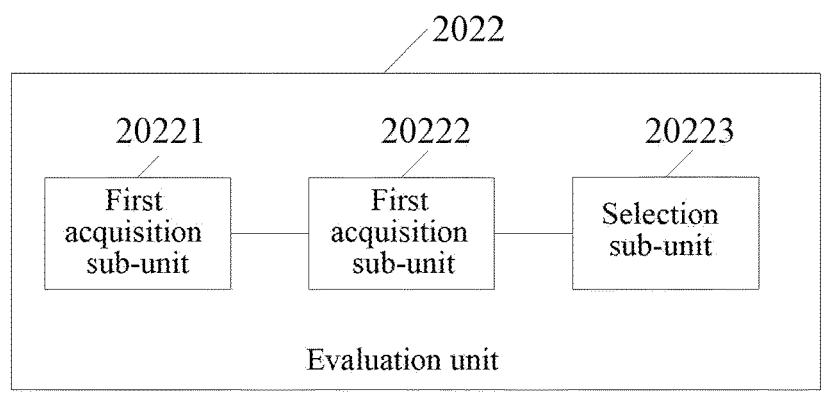
FIG. 8 is a schematic diagram illustrating detailed functional modules of the evaluation unit shown in FIG. 7.

In the embodiment, each pixel block has a pixel density which represents the average brightness of the pixel block. The definition is evaluated by the pixel density difference between the pixel block and adjacent pixel blocks, that is, in two images, the higher the pixel density difference between a pixel block and adjacent pixel blocks is, the clearer such portion is relatively. In contrary, the image is vague. As shown in FIG. 8, in an alternative embodiment, on the basis of the embodiment shown in FIG. 7, the evaluation unit 2022 includes:

a first acquisition sub-unit 20221 arranged to acquire the pixel density $\rho i$ of each of the pixel blocks conforming to a one-to-one correspondence relationship in the first and the second image; and a second acquisition sub-unit 20222 arranged to acquire the pixel distance Li between each pixel block and each adjacent pixel block according to the pixel density $\rho i$; and a selection sub-unit 20223 arranged to select pixel block with the biggest pixel distance Li in the pixel blocks conforming to a one-to-one correspondence relationship as a pixel block of high definition.

Herein, specifically, the second acquisition sub-unit 20222 is arranged to acquire the sum of the squares of the pixel density differences between each pixel block and each adjacent pixel block and extract the square root of the sum of squares to obtain the pixel distance Li.

The embodiment is described below based on examples.

The first image and the second image are both divided into 25 pixel blocks of 5*5, herein the pixel block 13 is the center area, as shown in the above Table 1.

Herein, the pixel densities of the corresponding pixel blocks are $\rho 1$, $\rho 2$, $\rho 25$.

Moreover, the pixel distance between a pixel block and adjacent pixel blocks is defined as Li (i=1, 2 . . . 25), as shown in Table 2.

The pixel distances L1, L5, L21 and L25 of four corners are as follows:

$$L1=sqrt[(\rho 1-\rho 2)^2+(\rho 1-\rho 6)^2+(\rho 1-\rho 7)^2];$$

$$L5=sqrt[(\rho 5-\rho 4)^2+(\rho 5-\rho 9)^2+(\rho 5-\rho 10)^2];$$

$$L21=sqrt[(\rho 21-\rho 16)^2+(\rho 21-\rho 17)^2+(\rho 21-\rho 22)^2];$$

$$L25=sqrt[(\rho 25-\rho 19)^2+(\rho 25-\rho 20)^2+(\rho 25-\rho 24)^2];$$

The pixel distances L2, L3 and L4 of upper borders are as follows:

$$Li=sqrt[(\rho i-\rho(i-1))^2+(\rho i-\rho(i+1))^2+(\rho i-\rho(i+4))^2+(\rho i-\rho(i+5))^2+(\rho i-\rho(i+6))^2]; (i=2,3,4)$$

The pixel distances L22, L23 and L24 of lower borders are as follows:

$$Li=sqrt[(\rho i-\rho(i-1))^2+(\rho i-\rho(i+1))^2+(\rho i-\rho(i-4))^2+(\rho i-\rho(i-5))^2+(\rho i-\rho(i-6)^2]; (i=22,23,24)$$

The pixel distances L6, L11 and L16 of left borders are as follows:

$$Li=sqrt[(\rho i-\rho(i-5))^2+(\rho i-\rho(i+1))^2+(\rho i-\rho(i-4))^2+(\rho i-\rho(i+5))^2+(\rho i-\rho(i+6))^2]; (i=6,11,16)$$

The pixel distances L10, L15 and L20 of right borders are as follows:

$$Li=sqrt[(\rho i-\rho(i-5))^2+(\rho i-\rho(i-1))^2+(\rho i-\rho(i-6))^2+(\rho i-\rho(i+5))^2+(\rho i-\rho(i+4))^2]; (i=10,15,20)$$

The pixel distances L7, L8, L9, L12, L13, L14, L17, L18 and L19 of middle portions are as follows:

$$Li=sqrt[(\rho i-\rho(i-6))^2+(\rho i-\rho(i-5))^2+(\rho 13-\rho(i-4))^2+(\rho i-\rho(i-1))^2+(\rho i-\rho(i+1))^2+(\rho i-\rho(i+4))^2+(\rho i-\rho(i+5))^2+(\rho i-\rho(i+6))^2]; (i=7,8,9,12,13,14,17,18,19)$$

In the embodiment, the pixel distances Li of the pixel blocks in the first and the second image which conform to a one-to-one correspondence relationship are analyzed to select the pixel block with the biggest pixel distance Li in both pixel blocks as a pixel block of high definition. For example, if the pixel distance L6 of the pixel block 6 in the first image is greater than the pixel distance L6 of the pixel block 6 in the second image, then the pixel block 6 in the first image is higher in definition than the pixel block 6 in the second image, and the pixel block 6 in the first image is selected as the part to synthesize for image synthesis.

The above mentioned is merely the preferred embodiment, which is not intended to limit the scope of the present document. Any equivalent structures or equivalent flow transformation that is devised based on the description and the accompanying drawings of the present document and any direct or indirect application to other related technical fields should all be included within the scope of protection of the present document.

INDUSTRIAL APPLICABILITY

By shooting, in an auto-focusing manner, two or more clear images at the same position and the same shooting angle and synthesizing the images to acquire the clearest one of corresponding portions in different images and use the acquired clearest one as the portion for synthesizing the images finally, the auto-focusing optimization method for a camera and the camera optimize portions of an image to provide a clearer final displayed image, improving the definition of the whole image, addressing the drawback that the images shot are not clear enough resulting from the existence of an error in the correspondence between the input current of a VCM and object distance.

What is claimed is:
1. An auto-focusing optimization method for a camera, comprising the following steps executed by the camera:

shooting, in an auto-focusing manner, at least a first image and a second image at a same position and a same shooting angle after the camera is started;
synthesizing the first and the second image; and
displaying an image after synthesis processing;
wherein the step of synthesizing the first and the second image comprises:
acquiring corresponding portions from the first and the second image and dividing the corresponding portions into pixel blocks conforming to a one-to-one correspondence relationship;
evaluating the pixel blocks conforming to the one-to-one correspondence relationship in the first and the second image to obtain the pixel blocks of high definition;
wherein the step of evaluating the pixel blocks conforming to the one-to-one correspondence relationship in the first and the second image to obtain the pixel blocks of high definition comprises:
acquiring a pixel density $\rho i$ of each of the pixel blocks conforming to the one-to-one correspondence relationship in the first and the second image.

2. The auto-focusing optimization method for a camera according to claim 1, wherein the step of shooting, in an auto-focusing manner, at least a first image and a second image at the same position and the same shooting angle after the camera is started comprises:
adjusting an input current of a voice coil motor of the camera to a first current to focus and shoot the first image; and
adjusting the input current of the voice coil motor of the camera to a second current to focus and shoot the second image.

3. The auto-focusing optimization method for a camera according to claim 2, wherein the step of synthesizing the first and the second image further comprises:
synthesizing the obtained pixel blocks.

4. The auto-focusing optimization method for a camera according to claim 3, wherein the step of evaluating the pixel blocks conforming to the one-to-one correspondence relationship in the first and the second image to obtain the pixel blocks of high definition further comprises:
acquiring a pixel distance Li between each pixel block and each adjacent pixel block according to the pixel density $\rho i$; and
selecting the pixel block with the biggest pixel distance Li in the pixel blocks conforming to the one-to-one correspondence relationship as a pixel block of high definition.

5. The auto-focusing optimization method for a camera according to claim 4, wherein the step of acquiring a pixel distance Li between each pixel block and each adjacent pixel block according to the pixel density $\rho i$ comprises:
acquiring a sum of squares of pixel density differences between each pixel block and each adjacent pixel block, and extracting a square root of the sum of the squares to obtain the pixel distance Li.

6. A non-transitory computer readable storage medium, comprising program instructions which, when executed by a camera, cause the camera to execute the auto-focusing optimization method for a camera according to claim 2.

7. The auto-focusing optimization method for a camera according to claim 1, wherein the step of synthesizing the first and the second image further comprises:
synthesizing the obtained pixel blocks.

8. The auto-focusing optimization method for a camera according to claim 7, wherein the step of evaluating the pixel blocks conforming to the one-to-one correspondence relationship in the first and the second image to obtain the pixel blocks of high definition further comprises:
acquiring a pixel distance Li between each pixel block and each adjacent pixel block according to the pixel density $\rho i$; and
selecting the pixel block with the biggest pixel distance Li in the pixel blocks conforming to the one-to-one correspondence relationship as a pixel block of high definition.

9. The auto-focusing optimization method for a camera according to claim 8, wherein the step of acquiring a pixel distance Li between each pixel block and each adjacent pixel block according to the pixel density $\rho i$ comprises:
acquiring a sum of squares of pixel density differences between each pixel block and each adjacent pixel block, and extracting a square root of the sum of the squares to obtain the pixel distance Li.

10. A non-transitory computer readable storage medium, comprising program instructions which, when executed by a camera, cause the camera to execute the auto-focusing optimization method for a camera according to claim 7.

11. A non-transitory computer readable storage medium, comprising program instructions which, when executed by a camera, cause the camera to execute the auto-focusing optimization method for a camera according to claim 1.

12. A non-transitory carrier on which the non-transitory computer readable storage medium of claim 11 is carried.

13. A camera, comprising a non-transitory computer readable storage medium, and
a processor coupled to the non-transitory computer readable storage medium, executing:
a shooting module to shoot, in an auto-focusing manner, at least a first image and a second image at a same position and a same shooting angle after the camera is started;
a synthesis module to synthesize the first and the second image; and
a display module to display an image after synthesis processing;
wherein the synthesis module comprises a division unit and an evaluation unit;
wherein the division unit is arranged to acquire corresponding portions from the first and the second image and divide the corresponding portions into pixel blocks conforming to a one-to-one correspondence relationship;
wherein the evaluation unit is arranged to evaluate the pixel blocks conforming to the one-to-one correspondence relationship in the first and the second image to obtain the pixel blocks of high definition; wherein the evaluation unit comprises a first acquisition sub-unit, and the first acquisition sub-unit is arranged to acquire a pixel density $\rho i$ of each of the pixel blocks conforming to the one-to-one correspondence relationship in the first and the second image.

14. The camera according to claim 13, wherein the shooting module comprises a first shooting unit and a second shooting unit, wherein
the first shooting unit is arranged to adjust an input current of a voice coil motor of the camera to a first current to focus and shoot the first image; and
the second shooting unit is arranged to adjust the input current of the voice coil motor of the camera to a second current to focus and shoot the second image.

15. The camera according to claim 14, wherein the synthesis module further comprises a synthesis unit, wherein the synthesis unit is arranged to synthesize the obtained pixel blocks.

16. The camera according to claim 15, wherein the evaluation unit further comprises a second acquisition sub-unit and a selection sub-unit, wherein the second acquisition sub-unit is arranged to acquire a pixel distance Li between each pixel block and each adjacent pixel block according to the pixel density ρi; and the selection sub-unit is arranged to select the pixel block with biggest the pixel distance Li in the pixel blocks conforming to the one-to-one correspondence relationship as a pixel block of high definition.

17. The camera according to claim 16, wherein the second acquisition sub-unit is arranged to acquire the pixel distance Li between each pixel block and each adjacent pixel block according to the pixel density ρi in a following way:

acquiring a sum of squares of pixel density differences between each pixel block and each adjacent pixel block, and extracting a square root of the sum of the squares to obtain the pixel distance Li.

18. The camera according to claim 13, wherein the synthesis module further comprises a synthesis unit, wherein the synthesis unit is arranged to synthesize the obtained pixel blocks.

19. The camera according to claim 18, wherein the evaluation unit further comprises a second acquisition sub-unit and a selection sub-unit, wherein the second acquisition sub-unit is arranged to acquire a pixel distance Li between each pixel block and each adjacent pixel block according to the pixel density ρi; and the selection sub-unit is arranged to select the pixel block with the biggest pixel distance Li in the pixel blocks conforming to the one-to-one correspondence relationship as a pixel block of high definition.

20. The camera according to claim 19, wherein the second acquisition sub-unit is arranged to acquire the pixel distance Li between each pixel block and each adjacent pixel block according to the pixel density ρi in a following way:

acquiring a sum of squares of pixel density differences between each pixel block and each adjacent pixel block, and extracting a square root of the sum of the squares to obtain the pixel distance Li.

* * * * *